United States Patent [19]

Kumaki et al.

[11] Patent Number: 4,602,361
[45] Date of Patent: Jul. 22, 1986

[54] APPARATUS FOR PLAYING BACK ROTATING RECORDING MEDIUMS

[75] Inventors: Takashi Kumaki, Sagamihara; Takashi Saito, Ayase, both of Japan

[73] Assignee: Victor Company of Japan, Limited, Japan

[21] Appl. No.: 571,654

[22] Filed: Jan. 17, 1984

[30] Foreign Application Priority Data

Jan. 18, 1983 [JP] Japan .................................. 58-4968[U]

[51] Int. Cl.$^4$ .......................... G11B 3/36; G11B 17/04
[52] U.S. Cl. ..................................... 369/77.2; 369/219
[58] Field of Search ............... 369/77.2, 79, 292, 219, 369/221

[56] References Cited

U.S. PATENT DOCUMENTS

| | | | |
|---|---|---|---|
| 4,150,833 | 4/1979 | Yamamura | 369/219 |
| 4,383,309 | 5/1983 | Hirata | 369/219 |
| 4,426,695 | 1/1984 | Moriki et al. | 369/221 |

*Primary Examiner*—Steven L. Stephan
*Attorney, Agent, or Firm*—Lowe, Price, LeBlanc, Becker & Shur

[57] ABSTRACT

A rotating recording medium such as a video disc placed on a turntable is played back by a signal pickup head movable radially over and across the disc. Before and after the disc is played back, it is supported by a disc support over the turntable, the disc support being movable vertically between elevated and lowered positions. A switching mechanism has a single motor for selectively moving the signal pickup head and the disc support. While the disc support is actuated by the switching mechanism, the signal pickup head is locked against movement by a locking mechanism. Since the signal pickup head and the disc support are selectively actuated by the single motor, the overall construction is relatively simple and can be manufactured inexpensively. When the signal pickup head remains inactivated, it is locked in a standby position against undesired movement even when the apparatus is tilted or subjected to an impact.

5 Claims, 6 Drawing Figures

APPARATUS FOR PLAYING BACK ROTATING RECORDING MEDIUMS

BACKGROUND OF THE INVENTION

The present invention relates to an apparatus for playing back rotating recording mediums such for example as video discs, PCM audio discs, or the like, and more particularly to a control mechanism in such an apparatus having a single motor for selectively moving a signal pickup head and lifting and lowering a rotating recording medium.

Known apparatus for playing back rotating recording mediums of the kinds described above (hereinafter referred to as a "disc") generally have a signal pickup head disposed over a turntable and movable radially across the disc placed on the turntable to reproduce signals recorded on the disc while the latter rotates at a high speed. According to one type of such disc playback apparatus, a jacket containing a disc is inserted into the apparatus to place the disc therein for reproducing the signals stored in the disc. The disc playback apparatus has a disc lifting and lowering mechanism movable upwardly and downwardly while supporting the disc left in the apparatus. When in an upper position, the mechanism holds the disc over the turntable. After the jacket has been pulled out of the apparatus, the mechanism is lowered to place the disc onto the turntable.

The disc playback apparatus also includes a mechanism for moving the signal pickup head, the mechanism being drivable by a dedicated motor of its own. Since the disc lifting and lowering mechanism is actuated by another dedicated motor of its own, the conventional apparatus is complex in its entirety, tedious and time-consuming to assemble, and expensive to manufacture.

SUMMARY OF THE INVENTION

It is an object of the present invention to provide an apparatus for playing back rotating recording mediums which has a control mechanism for selectively actuating a signal pickup head moving mechanism and a rotating recording medium lifting and lowering mechanism with a single motor, and thus which is composed of a reduced number of components and relatively inexpensive to manufacture.

According to the present invention, there is provided an apparatus for playing back a rotating recording medium such as a video disc or the like, comprising a turntable for placing the disc thereon, a signal pickup head for reproducing signals recorded on the disc, first means for moving the signal pickup head radially over and across the disc on the turntable, second means movable selectively into an elevated position for supporting the disc above the turntable and into a lowered position for placing the disc on the turntable, a switching mechanism including a sole motor for selectively actuating the first and second means with the sole motor, and a locking mechanism responsive to operation of the switching mechanism for locking the first means against movement while the second means is being actuated by the switching mechanism.

The first and second means are selectively actuatable by the single motor, and hence the apparatus is relatively simple in construction and can be manufactured inexpensively. While the second means is in operation, the first means is locked against movement by the locking mechanism, so that the signal pickup head will stay safely and stably in its standby position even when forces are applied to move the signal pickup head at the time the apparatus is tilted or subjected to shocks.

BRIEF DESCRIPTION OF THE DRAWINGS

The present invention will be described in detail by way of illustrative example with reference to the accompanying drawings, in which.

DETAILED DESCRIPTION

Figure 1:
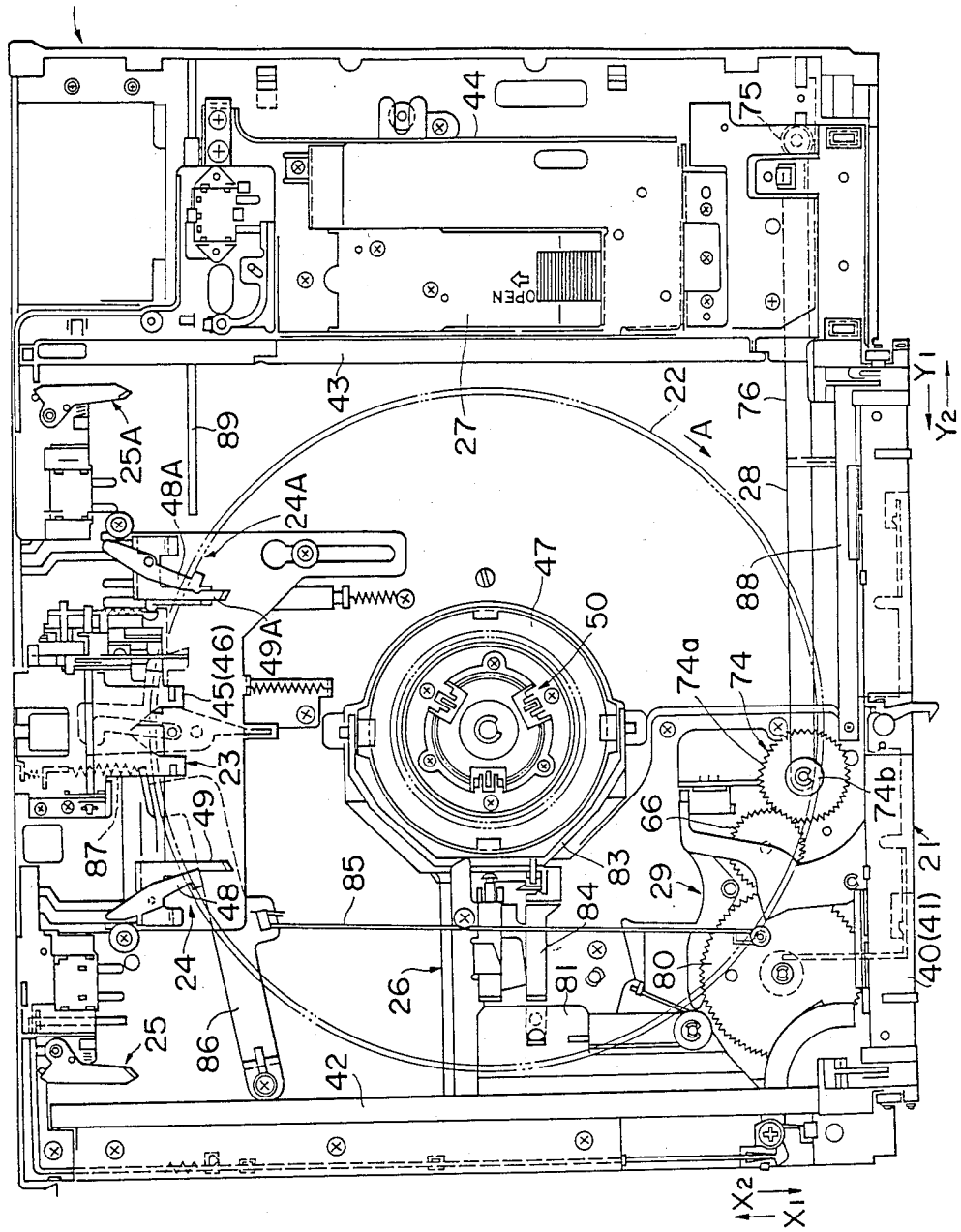
FIG. 1 is a plan view of a disc playback apparatus according to the present invention, with a top cover omitted from illustration, prior to the insertion of a disc.

FIG. 1 shows a disc playback apparatus, generally designated by the reference character 1, according to the present invention, for playing back a disc 3 (FIG. 2), which is contained in a disc case 2 when not in use.

Figure 2:
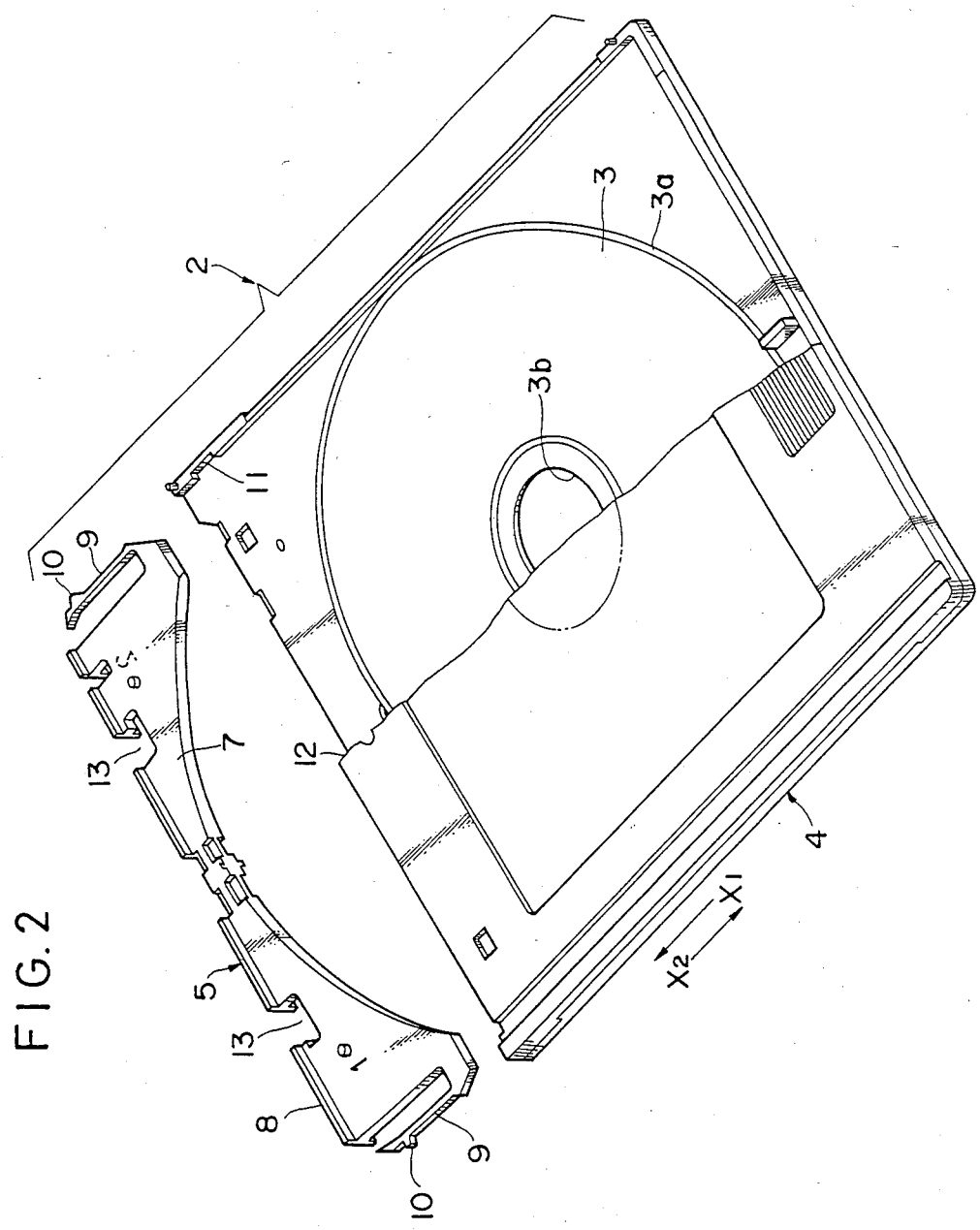
FIG. 2 is a fragmentary exploded perspective view of a disc case for use in the disc playback apparatus shown in FIG. 1.

As illustrated in FIG. 2, the disc case 2 is basically composed of a jacket 4 and a lid plate 5 mounted therein. The disc 3 is accommodated in a flat space defined in the jacket 4. The lid plate 5 comprises a body 7, a flange 8 on a front edge of the body 7, and a pair of engaging arms 9 on side edges of the body 7, the engaging arms 9 having locking projections 10, respectively. When the lid plate 5 is disposed in the jacket 4, the locking projections 10 of the engaging arms 9 engage respectively in recesses 11 defined in opposite inner side walls of the jacket 4 with the flange 8 closing an opening or slot 12 in the jacket 4.

As shown in FIG. 1, the disc playback apparatus 1 generally includes a jacket opening mechanism or jacket opener 21, a turntable 22 for placing and rotating the disc 3 thereon, a disc clamp mechanism 23 for clamping the disc 3, lid plate holding mechanisms 24, 24A for holding the lid plate 5 when the disc 3 is to be mounted on the turntable 22 and releasing the lid plate 5 when the disc 3 is to be removed from the apparatus 1, lid plate releasing mechanisms 25, 25A for releasing the lid plate 5 from the jacket 4 when the disc case 2 is inserted deeply into the apparatus 1, a disc lifting and lowering mechanism 26 for lifting and lowering the disc 3 over the turntable 22, a signal pickup head moving mechanism 28 for moving a signal pickup head 27 in the directions of the arrows Y1, Y2 radially of the disc 3 placed on the turntable 22, and a control mechanism 29 for selectively actuating the disc lifting and lowering mechanism 26 and the signal pickup head moving mechanism 28.

The jacket opening mechanism 21 has a pair of upper and lower beams 40, 41 for opening the slot 12 in the jacket 4 and is movable across and over the turntable 22 in the directions of the arrows X1, X2 with opposite ends of the beams 40, 41 guided by a pair of guide rails 42, 43. The signal pickup head 27 is mounted on a carrier 44 movable in the directions of the arrows Y1, Y2. The disc clamp mechanism 23 is disposed back in the apparatus 1 and has a pair of upper and lower clamp fingers 45, 46.

For playing back the disc 3, a standby button (not shown) is depressed, and the disc case 2 is inserted into the apparatus 1. In response to the actuation of the standby button, the control mechanism 29 is actuated to cause the disc lifting and lowering mechanism 26 to raise a disc support 47, and the disc clamp mechanism 23 is brought into a condition ready for clamping the disc 3.

When the disc case 2 is inserted into the apparatus 1 in the direction of the arrow X1, the slot 12 in the jacket 4 is vertically forced open by the jacket opening mechanism 21 as the latter is pushed into the apparatus 1. In response to full insertion of the disc case 2 deeply into the apparatus 1, the disc clamp mechanism 23 is operated to enable the clamp fingers 45, 46 to clamp a groove guard 3a (FIG. 2) of the disc 3, and the lid plate holding mechanisms 24, 24A are operated to cause locking fingers 48, 48A thereof to enter L-shaped recesses 13 in the lid plate 5 and then to turn into engagement with the lid plate 5. The lid plate 5 is now engaged by the locking fingers 48, 48A and placed on support fingers 49, 49A respectively of the mechanisms 24, 24A. Therefore, the lid plate 5 is locked in the apparatus 1. At the same time, the lid plate releasing mechanisms 25, 25A are actuated to release the lid plate 5 from the jacket 4.

When the disc case 2 is thereafter pulled in the direction of the arrow X2, only the jacket 4 is removed out of the apparatus 1 while leaving the lid plate 5 and the disc 3 therein. At this time, the jacket opening mechanism 21 is also moved back in the direction of the arrow X2. The disc 3 is horizontally supported directly above the turntable 22 by the disc support 47 as elevated on a peripheral edge around a central hole 3b in the disc 3 with the groove guard 3a clamped by the disc clamp mechanism 23.

On removal of the jacket 4 out of the apparatus 1, the disc clamp mechanism 23 releases the disc 3 and the disc support 47 is lowered to allow the disc 3 to be placed on the turntable 22, whereupon the peripheral edge around the central hole 3b in the disc 3 is clamped by a clamp finger mechanism 50 on the turntable 22. The turntable 22 is now rotated by a turntable motor (not shown) to rotate the disc 3 thereon clockwise (FIG. 1) in the direction of the arrow A.

The carrier 44 is then moved in the direction of the arrow Y1 to have the signal pickup head 27 relatively scan the signal recording surface of the disc 3 for thereby reproducing information signals.

The disc 3 can be removed from the apparatus 1 and retrieved into the disc case 2 in the following manner: After the disc 3 is played back or the playback mode is interrupted, the carrier 44 with the signal pickup head 27 thereon is moved in the direction of the arrow Y2 back to the original position, and the disc support 47 is raised to lift the disc 3 which is then clamped by the disc clamp mechanism 23.

The empty jacket 4 is inserted again into the apparatus 1 with the slot 12 positioned ahead. The jacket opening mechanism 21 is pushed again by the jacket 4 in the direction of the arrow X1 while opening the slot 12 in the jacket 4. The insertion of the jacket 4 in the direction of the arrow X1 causes the disc 3 to be inserted into the jacket 4 through the slot 12. When the jacket 4 is fully inserted into the apparatus 1, the disc 3 is stored in the jacket 4, and the lid plate 5 enters the jacket 4, closing the slot 12. The lid plate 5 is separated from the lid plate releasing mechanisms 25, 25A and locked in the jacket 4. By then pulling the jacket 4 in the direction of the arrow X2, the jacket 4 with the lid plate 5 coupled thereto is moved in the direction of the arrow X2 and hence the disc 3 is removed from the apparatus 1 and stored back into the disc case 2.

The control mechanism 29 will now be described in detail with reference to FIGS. 3 through 6.

Figure 3:
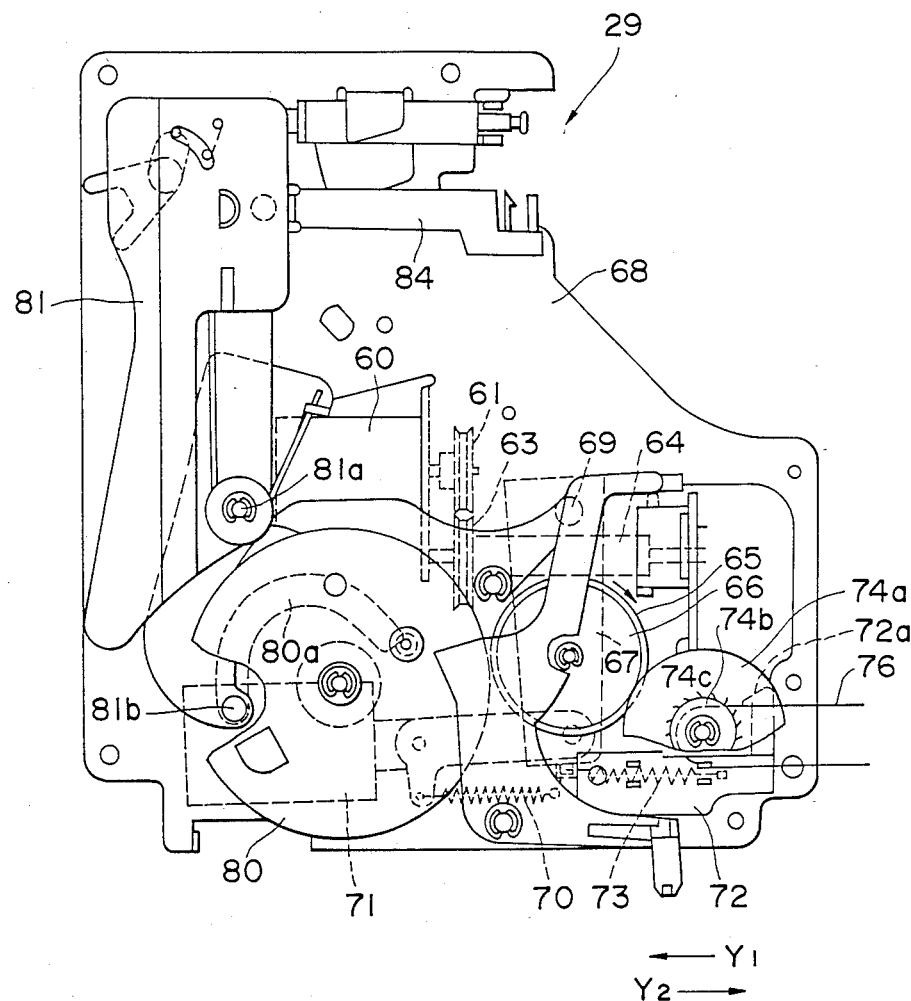
FIG. 3 is a plan view of a control mechanism in the disc playback apparatus.
Figure 4:
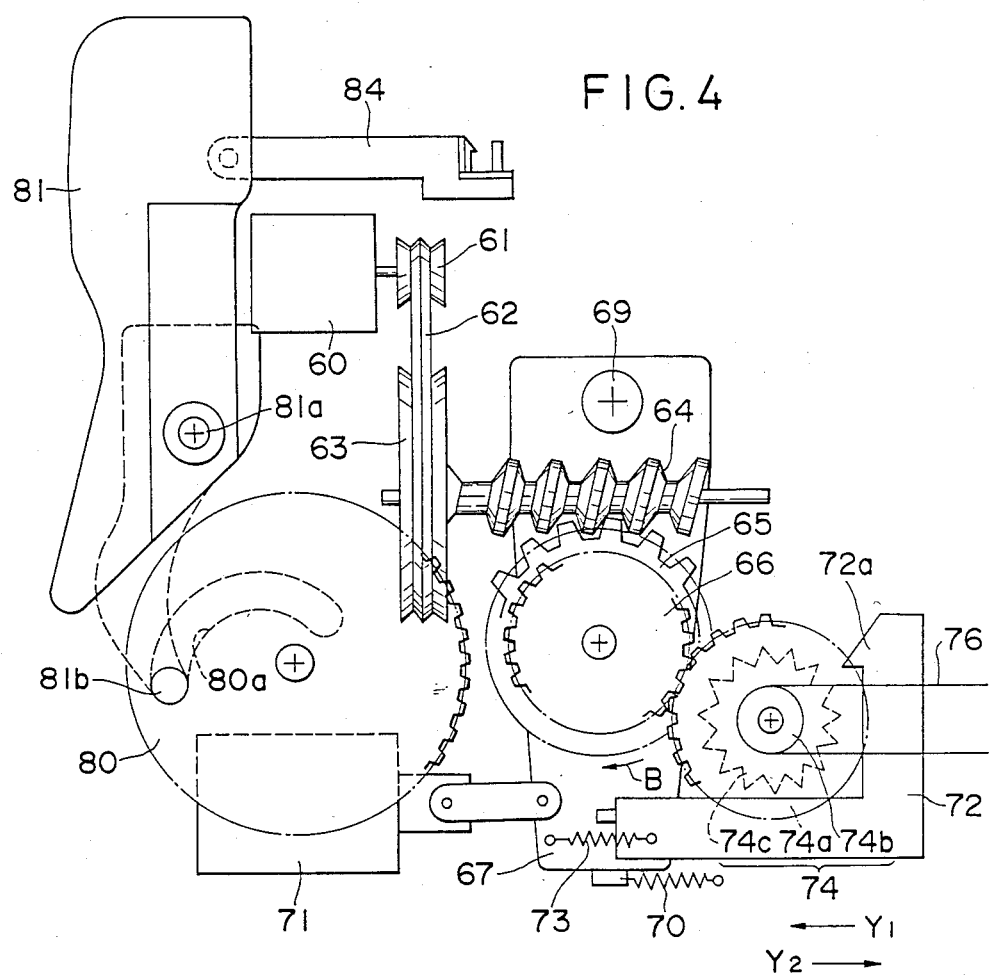
FIG. 4 is a plan view of a power transmission system in the control mechanism which is switched for transmitting the power from a motor to a mechanism for moving a signal pickup head.
Figure 5:
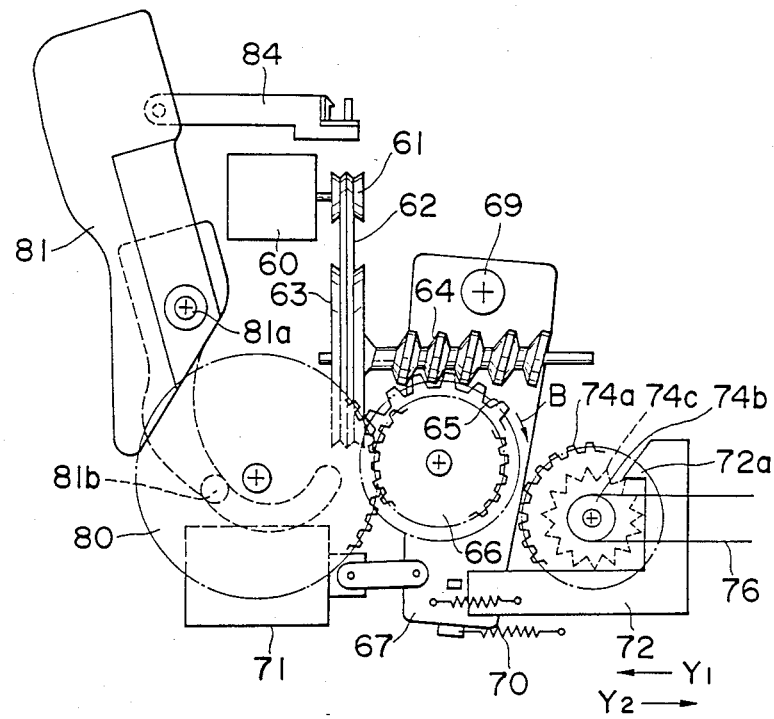
FIG. 5 is a plan view of the power transmission system which is switched for transmitting the motor power to a mechanism for lifting and lowering a disc.

FIG. 3 shows the control mechanism 29 and portions of the disc lifting and lowering mechanism 26 and the signal pickup head moving mechanism 28. FIGS. 4 and 5 are illustrative of the positions in which the transmission path for motor power is switched to the signal pickup head moving mechanism 28 and the disc lifting and lowering mechanism 26, respectively.

A motor 60 serves to selectively actuate the signal pickup head moving mechanism 28 and the disc lifting and lowering mechanism 26 (disc clamp mechanism 23). The rotative power from the motor 60 is transmitted through a pulley 61, a belt 62, a pulley 63, and a worm 64 to a worm wheel 65, whereupon the worm wheel 65 and a gear 66 coaxial therewith rotate in unison in the direction of the arrow B (FIGS. 4 and 5). The pulley 61, the belt 62, the pulley 63, the worm 64, and the worm wheel 65 jointly constitute a speed reducer. The worm wheel 65 and the gear 66 are supported on a switching arm 67 and positioned between a gear and pulley assembly 74. As described later on, the worm 64 and the worm wheel 65 double as a locking means.

The switching arm 67 is swingably mounted at one end on a pin 69 supported on a base 68 and connected at the other end to an extension coil spring 70 and a plunger 71. The switching arm 67 is therefore reciprocably pivotable about the pin 69 in response to actuation of the plunger 71 for bringing the gear 66 into selective driving mesh with a driver gear 74a of the gear and pulley assembly 74 and another driver gear or main gear 80. Since the worm wheel 65 can roll axially along the worm 64, the switching arm 67 is smoothly pivotable about the pin 69, and the worm wheel 65 is kept in proper meshing engagement with the worm 64 after the switching arm 67 has been turned.

An L-shaped locking arm 72 is connected by an extension coil spring 73 to the switching arm 67 for movement in the direction of the arrow Y1 or Y2 in response to turning movement of the switching arm 67. The locking arm 72 has a locking prong 72a and is movable in the direction of the arrow Y1 to cause the locking prong 72a to engage a locking gear 74c of the gear and pulley assembly 74 for thereby locking the latter against rotation, as shown in FIG. 5.

The gear and pulley assembly 74 comprises an integral construction composed of the gear 74a, a pulley 74b, and the locking gear 74c. A timing belt 76 is trained around the pulley 74b and a pulley 75 (shown in FIG. 1), the timing belt 76 being fixed to the carrier 44. The gear and pulley assembly 74 and the timing belt 76 jointly serve as the signal pickup head moving mechanism 28.

The disc lifting and lowering mechanism 26 is composed of the main gear 80 drivable by the gear 66, a control arm 81 having a pin 81b and angularly movable while the pin 81b is guided by a cam groove 80a when the main gear 80 rotates, a lifter arm 83 (FIG. 6) supported on a horizontal shaft 82, the lifter arm 83 being Y-shaped when viewed in a plan and L-shaped when viewed in a front elevation, the disc support 47 movable vertically in response to turning movement of the lifter arm 83, and a link 84 connecting the control arm 81 and the lifter arm 83. The disc support 47 is thus movable vertically in response to turning movement of the control arm 81.

As shown in FIG. 1, the main gear 80 and the lower clamp finger 46 of the disc clamp mechanism 23 are operatively interconnected by a rod 85, a pull lever 86, and a coil spring 87.

The control mechanism 29, the the disc lifting and lowering mechanism 26, and the signal pickup head moving mechanism 28 thus constructed will operate as follows:

Before the disc 3 is inserted into the apparatus 1, the control mechanism 29 is in the position shown in FIGS. 1, 3, and 4. In this illustrated position, the plunger 71 remains de-energized, the switching arm 67 is turned counterclockwise under the bias of the spring 70, and the gear 66 is held in mesh with the gear 74a. The gear and pulley assembly 74 is locked against rotation by the meshing engagement of the worm 64 and the worm wheel 65. Accordingly, the carrier 44 is securely maintained in the standby position illustrated in FIG. 1 even when the apparatus 1 is subjected to an impact due to an object falling thereon or is tilted to impose a force on the carrier 44 tending to move the latter in the direction of the arrow Y1.

Figure 6:
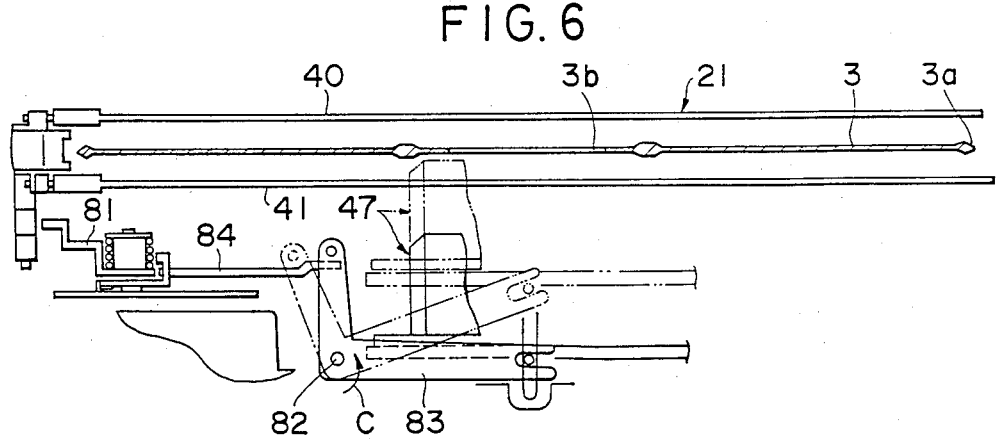
FIG. 6 is an elevational view of the disc lifting and lowering mechanism.

When the standby button is depressed for initiating a disc playback mode, the plunger 71 is actuated and the motor 60 starts rotating to raise the disc support 47. More specifically, when the plunger 71 is actuated, the switching arm 67 is turned clockwise against the force of the spring 70 to bring the gear 66 out of mesh with the gear 74a and into mesh with the main gear 80, as shown in FIG. 5. Then, the rotative power from the motor 60 is transmitted through the pulley 61, the belt 62, the pulley 63, the worm 64, the worm wheel 65, and the gear 66 to the main gear 80, which is now angularly moved counterclockwise to turn the control arm 81 counterclockwise about a shaft 81a. As shown in FIG. 6, the lifter arm 83 is then pulled by the link 84 so as to be turned counterclockwise in the direction of the arrow C about the shaft 82, thus lifting the disc support 47 operatively coupled to the lifter arm 83. After the disc support 47 has been raised, the motor 60 is temporarily de-energized. The plunger 71 remains inactivated and the gear 60 is kept in mesh with the main gear 80. Thus, the main gear 80 which is part of the disc lifting and lowering mechanism 26 is locked against rotation by the intermeshing relation between the worm 64 and the worm wheel 65, so that the disc support 47 is maintained at the elevatated position even when it is subjected to an undue impact or shock. The counterclockwise turning movement of the main gear 80 also causes the rod 85, the pull lever 86, and the coil spring 87 to place the disc clamp mechanism 23 into a condition ready for clamping the disc 3.

As the switching arm 67 is angularly moved clockwise as described above, the locking arm 72 is moved in the direction of the arrow Y1 under the resiliency of the spring 73 to enable the locking prong 72a to engage the locking gear 74c, whereupon the gear and pulley assembly 74 is locked against rotation. Accordingly, the signal pickup head moving mechanism 28 remains locked even after the standby button has been depressed. The carrier 44 is therefore kept stably in the standby position against unwanted movement when the apparatus 1 is tilted or undergoes an impacting load as upon being moved to a different position after the standby button has been depressed.

When the disc case 2 is then inserted and pulled out in the manner described above, the disc 3 is clamped by the disc clamp mechanism 23 and supported in the disc support 47, that is, the disc 3 is left in the apparatus 1. At the time the jacket 4 is pulled out of the apparatus 1, the plunger 71 is de-energized to allow the switching arm 67 to turn counterclockwise under the resilient force of the spring 70. The gear 66 is now brought out of mesh with the main gear 80 and into mesh with the gear 74a again, and the locking arm 72 is displaced in the direction of the arrow Y2 to disengage the locking prong 72a from the locking gear 74c, whereupon the gear and pulley assembly 74 is released from the locking arm 72. Upon disengagement from the gear 66, the main gear 80 is turned back to the original position under a spring force for thereby allowing the lower clamp finger 46 and the disc support 47 to move downwardly. The disc 3 is now released and placed on the turntable 22.

The motor 60 starts to rotate again to rotate the gear 74a held in mesh with the gear 66. The gear 74b is rotated thereby to enable the timing belt 76 to run and move the carrier 44 over the disc 3 in the direction of the arrow Y1 while being guided by a guide rod 88 and a rail 89 (FIG. 1). The signals recorded on the disc 3 can now be reproduced by the signal pickup head 27 on the carrier 44. The speed and direction of movement of the carrier 44 and hence the signal pickup head 27 can be controlled by controlling the rotation of the motor 60.

Although a certain preferred embodiment of the present invention has been shown and described in detail, it should be understood that various changes and modifications may be made therein without departing from the scope of the appended claims.

What is claimed is:

1. An apparatus for playing back a rotating recording medium, comprising:
    (a) a turntable for placing the rotating recording medium thereon;
    (b) a signal pickup head for reproducing signals recorded on the rotating recording medium on said turntable;
    (c) first means for moving said signal pickup head radially over and across the rotating recording medium on said turntable;
    (d) second means movable selectively into an elevated position for supporting the rotating recording medium above said turntable and into a lowered position for placing the rotating recording medium on said turntable;
    (e) a switching mechanism including a sole motor for selectively actuating said first and second means with said sole motor; and
    (f) a locking mechanism responsive to operation of said switching mechanism for locking said first means against movement while said second means is being actuated by said switching mechanism, said first and second means including first and second driver gears, respectively, having respective parallel shafts and spaced from each other, said switching mechanism comprising a base, a switching arm pivotally mounted on said base, a worm gear assembly rotatably mounted on said switching arm and having a worm wheel and a third gear coaxially rotatable in unison therewith, said third gear being positioned between said first and second gears for selective meshing engagement therewith, a worm operatively connected to said motor and held in driving mesh with said worm wheeel, axes of said worm and worm wheel being generally perpendicular to each other, and a plunger operatively coupled to said switching arm for angularly moving the switching arm to move said worm wheel axially along said worm while in mesh therewith to thereby move said third gear into selective driving mesh with said first and second gears.

2. An apparatus according to claim 1, wherein said locking mechanism further includes a spring acting between said switching arm and said base for normally biasing said worm gear into driving mesh with said first gear.

3. An apparatus according to claim 1, wherein said second gear has a cam groove, said second means further including a control arm angularly movable and having a pin guided by said cam groove, a pivotable lifter arm, a link interconnecting said control arm and said pivotable lifter arm, and a disc support movable between said elevated and lowered positions while supporting the rotating recording disc thereon in response to angular movement of said control arm caused by said pin and said cam groove when said second gear is turned by said worm gear.

4. An apparatus for playing back a rotating recording medium, comprising:
(a) a turntable for placing the rotating recording medium thereon;
(b) a signal pickup head for reproducing signals recorded on the rotating recording medium on said turntable;
(c) first means for moving said signal pickup head radially over and across the rotating recording medium on said turntable;
(d) second means movable selectively into an elevated position for supporting the rotating recording medium above said turntable and into a lowered position for placing the rotating recording medium on said turntable;
(e) a swtiching mechanism including a sole motor for selectively actuating said first and second means with said sole motor; and
(f) a locking mechanism responsive to operation of said switching mechanism for locking said first means against movement while said second means is being actuated by said switching mechanism, wherein said first and second means include first and second driver gears, respoectively, said switching mechanism comprising a base, a switching arm pivotably mounted on said base, a third gear rotatably mounted on said switching arm, a speed reducer operatively connected between said motor and said gear, and a plunger operatively coupled to said switching arm for bringing said third gear into selective driving mesh with said first and second gears, wherein said first means further includes a locking gear rotatable with said first gear, said locking mechanism comprising a locking arm operatively coupled to said switching arm and having a locking prong engageable with said locking gear for locking said first gear against rotation in response to angular movement of said switching arm to bring said third gear into driving mesh with said second gear.

5. An apparatus according to claim 4, wherein said locking mechanism further comprises a spring acting between said switching arm and said locking arm for normally biasing the latter in a direction to cause said locking prong to engage said locking gear.

* * * * *